US009092602B2

(12) United States Patent
Hung et al.

(10) Patent No.: US 9,092,602 B2
(45) Date of Patent: Jul. 28, 2015

(54) PRESSURE KEY AND METHOD FOR PROTECTING SECURITY OF COMPUTING DEVICE USING THE PRESSURE KEY

(71) Applicants: HONG FU JIN PRECISION INDUSTRY (WuHan) CO., LTD., Wuhan (TW); HON HAI PRECISION INDUSTRY CO., LTD., New Taipei (TW)

(72) Inventors: Jian-Hung Hung, New Taipei (TW); Xin-Shu Wang, Wuhan (CN); Min Yang, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/082,239

(22) Filed: Nov. 18, 2013

(65) Prior Publication Data
US 2014/0150089 A1   May 29, 2014

(30) Foreign Application Priority Data
Nov. 29, 2012   (CN) .......................... 2012 1 04986114

(51) Int. Cl.
*G06F 7/04* (2006.01)
*G06F 21/31* (2013.01)
*G06F 21/57* (2013.01)

(52) U.S. Cl.
CPC .............. *G06F 21/31* (2013.01); *G06F 21/575* (2013.01)

(58) Field of Classification Search
CPC ......... G06F 21/32; G06F 21/34; G06F 21/31; G06F 2221/2153; G06Q 20/40145; H04W 12/06; H04W 12/08; H04L 63/105
USPC ............................... 726/18, 1, 2, 27; 380/277
See application file for complete search history.

(56) References Cited

U.S. PATENT DOCUMENTS

| 8,296,728 | B1 * | 10/2012 | Webster | ......................... | 717/109 |
| 2003/0088780 | A1 * | 5/2003 | Kuo et al. | ..................... | 713/185 |
| 2007/0143117 | A1 * | 6/2007 | Conley | ........................... | 704/275 |
| 2010/0278344 | A1 * | 11/2010 | Rhelimi | ......................... | 380/277 |

OTHER PUBLICATIONS

Lee (2003). Structure & Interpretation of Signal & Systems. Addison Wesley. ISBN:0-201-74551-8. Chapter 1.*

* cited by examiner

*Primary Examiner* — Brian Shaw
(74) *Attorney, Agent, or Firm* — Novak Druce Connolly Bove + Quigg LLP

(57) ABSTRACT

A pressure key includes a pressure sensor, a microprocessor chip, a storage device, a port, a record button and an enter button. When the pressure key is connected to a computing device and the record button is pressed, the pressure sensor is triggered to record a pressure signal input by a user. The microprocessor chip converts the pressure signal into a password, stores the password into the storage device, and sends the password to the computing device to lock the computing device. When the pressure key is connected to the computing device again and the enter button is pressed, the microprocessor chip retrieves the password from the storage device and sends the password to the computing device. The computing device is unlocked if the received password matches the password stored in the computing device.

12 Claims, 2 Drawing Sheets

PRESSURE KEY AND METHOD FOR PROTECTING SECURITY OF COMPUTING DEVICE USING THE PRESSURE KEY

BACKGROUND

1. Technical Field

Embodiments of the present disclosure relate to security protection systems and methods, and more particularly to a pressure key and a method for protecting security of a computing device using the pressure key.

2. Description of related art

Passwords are widely used for protecting electronic devices from access from unauthorized users. However, simple passwords are easy to guess or attack, and complex passwords are difficult for authorized users to remember. Therefore, there is room for improvement.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module", as used herein, refers to logic embodied in hardware or firmware, or to a collection of software instructions, written in a programming language. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
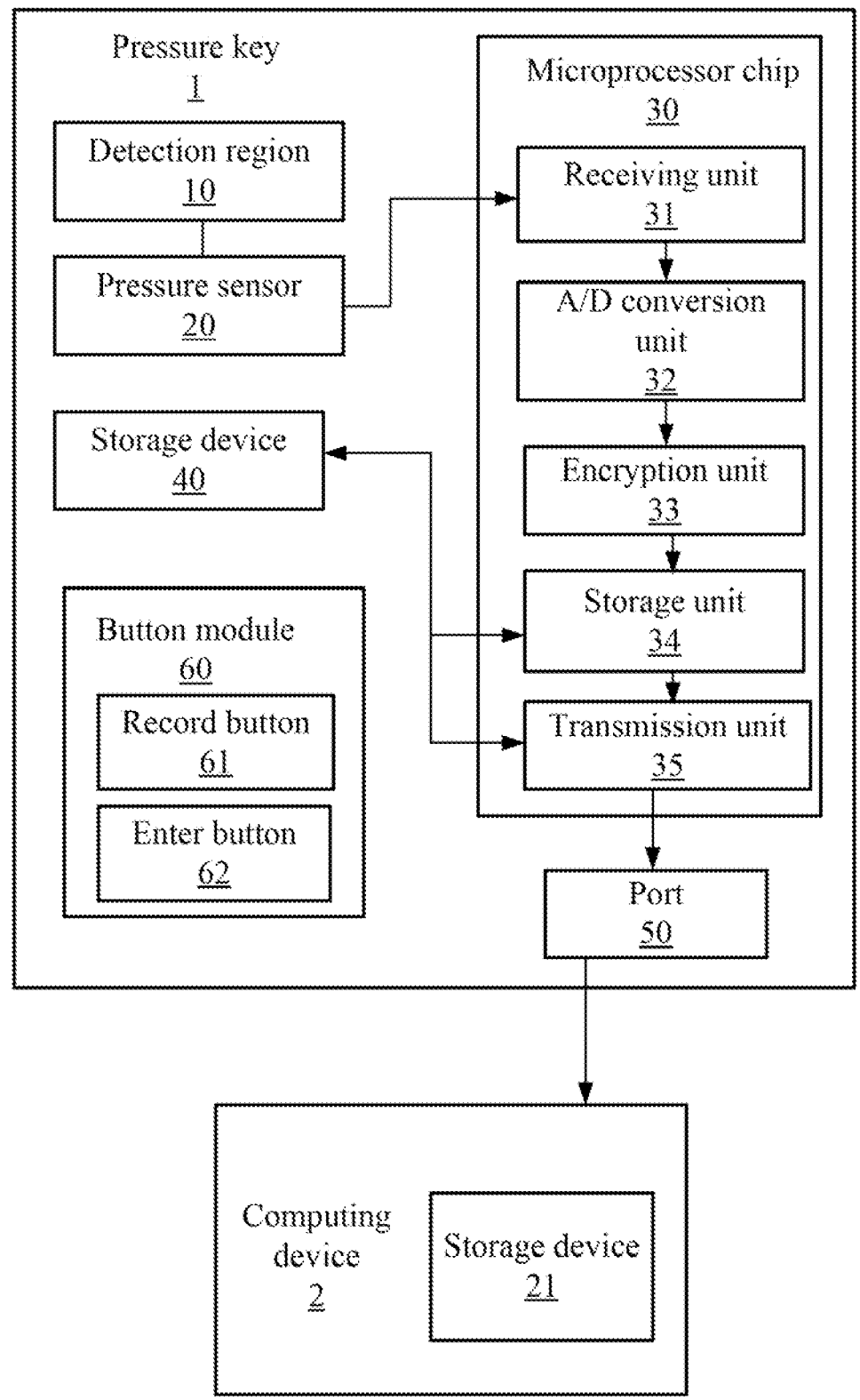
FIG. 1 is a block diagram of one embodiment of a computing device comprising function modules of a pressure key.

FIG. 1 is a block diagram of one embodiment of a computing device 2 comprising function modules of a pressure key 1. The pressure key 1 includes a detection region 10, a pressure sensor 20, a microprocessor chip 30, a storage device 40, a port 50, and a button module 60. The microprocessor chip 30 includes a receiving unit 31, an analog/digital (A/D) conversion unit 32, an encryption unit 33, a storage unit 34, and a transmission unit 35. The units 31-35 include computerized code in the form of one or more programs. The button module 60 includes a record button 61 and an enter button 62. In other embodiments, the detection region 10 and the pressure sensor 20 may be integrated as one component.

In one embodiment, the pressure key 1 is a portable electronic device that can connect to the computing device 2 via the port 50. The port 50 may be a serial port or a universal serial bus (USB) port, for example. The computing device 2 may be a computer or other electronic device that having data processing capabilities.

A process of locking the computing device 2 by the pressure key 1 is described as follows. When the computing device 2 is powered on, s the pressure key 1 is electronically connected to the computing device 2 via the port 50. In response to receiving a first signal of the record button 61 being pressed by a user, the receiving unit 31 triggers the pressure sensor 20 to record a pressure signal input by the user via the detection region 10 and transmit the pressure signal to the A/D conversion unit 32. For example, the user may press the detection region 10 to input the pressure signal. The pressure signal input by the user is an analog signal. The A/D conversion unit 32 converts the analog signal into a digital signal, and transmits the digital signal to the encryption unit 33.

The encryption unit 33 processes the digital signal according to a preset rule to generate a password. In one embodiment, the preset rule may be an encryption algorithm, such as DES, 3DES, TDEA, Blowfish, RC5, or IDEA. In other embodiment, the preset rule may be user-defined. For example, the user-defined rule may be set as taking digital values of the digital signal as the password, or taking a portion of the digital values of the digital signal as the password, for example.

The storage unit 34 stores the password in the storage device 40 of the pressure key 1, and the transmission unit 35 transmits the password to the computing device 2. The computing device 2 stores the password in a storage device 21, and locks the computing device 2 by the password. The storage device 40 and the storage device 21 can be dedicated memories, such as EPROMs, hard disk drives (HDDs), or flash memories. After the computing device 2 is locked, the pressure key 1 is electronically disconnected from the computing device 2.

A process of unlocking the computing device 2 by the pressure key 1 is described as follows. At first, in a second instance, the pressure key 1 is electronically connected to the computing device 2 via the port 50. In response to receiving a second signal of the enter button 62 being pressed by the user, the receiving unit 31 triggers the transmission unit 35 to retrieve the password from the storage device 40 and send the password to the computing device 2. The computing device 2 compares the received password with the password stored in the storage device 21, unlocks the computing device 2 if the received password matches the password stored in the storage device 21, or refuses to unlock the computing device 2 if the received password does not match the password stored in the storage device 21.

In other embodiment, the button module 60 of the pressure key 1 may be icons displayed on a display device (not shown) of the computing device 2 and are selectable by users. For example, the record button 61 may be replaced by a record icon displayed on the display device of the computing device 2. When the record icon is selected by the user, it indicates that the user intends to generate a password and lock the computing device 2 using the pressure key 1. The enter button 62 may be replaced by an enter icon displayed on the display device of the computing device 2. When the enter icon is selected by the user, it indicates that the user intends to unlock the computing device 2 using the pressure key 1.

Figure 2:
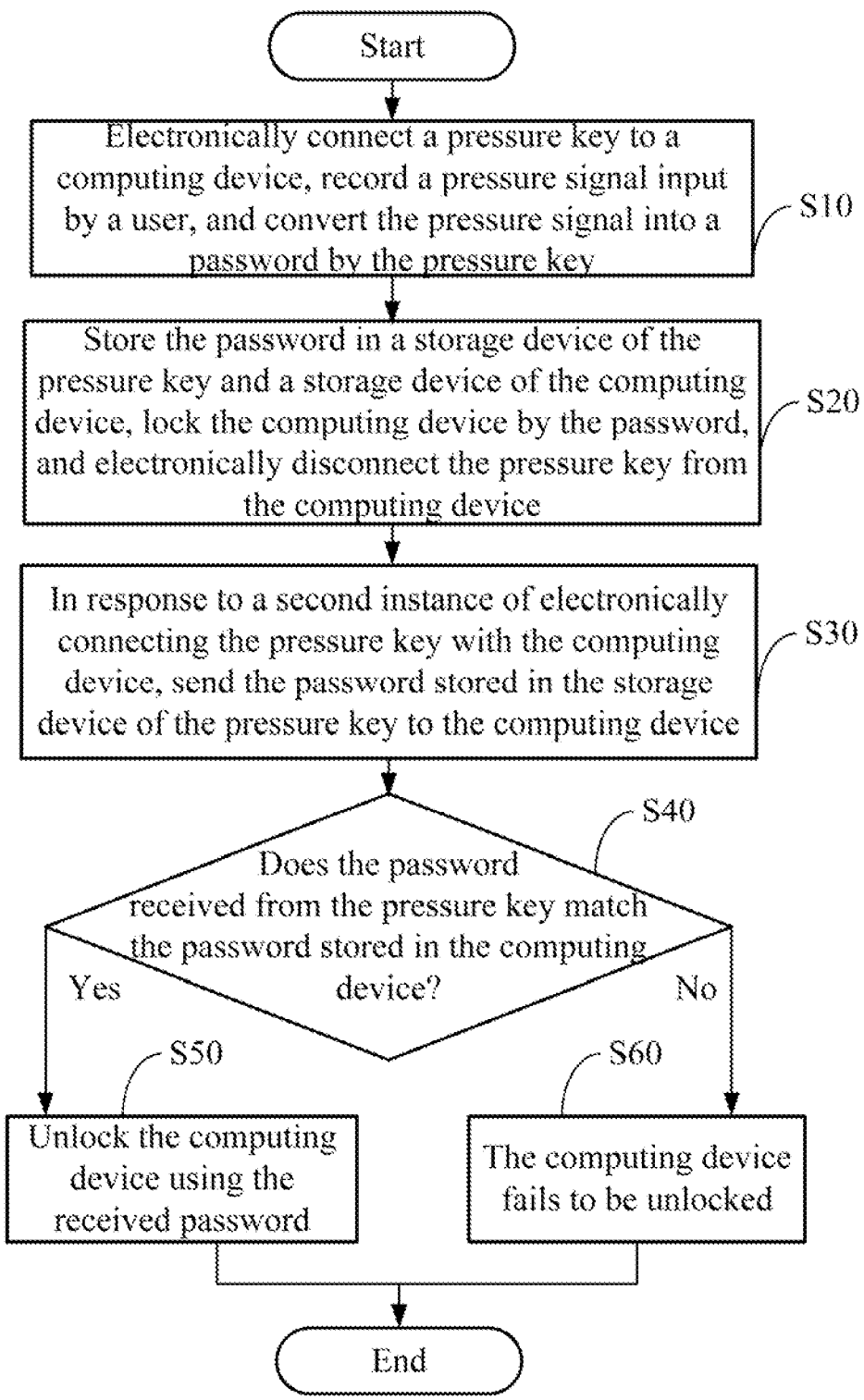
FIG. 2 is one embodiment of a flowchart of a method for protecting security of the computing device using the pressure key of FIG. 1.

FIG. 2 is a block diagram of one embodiment of a method for protecting security of the computing device 2 using the pressure key 1. Depending on the embodiment, additional steps may be added, others removed, and the ordering of the steps may be changed.

In step S10, when the computing device 2 is powered on, the pressure key 1 is electronically connected to the computing device 2 via the port 50 by a user. In response to receiving a first signal of the record button 61 being pressed by the user, the receiving unit 31 triggers the pressure sensor 20 to record a pressure signal input by the user and transmit the pressure signal to the A/D conversion unit 32. The pressure signal input by the user is an analog signal. The A/D conversion unit 32 converts the analog signal into a digital signal, and transmits the digital signal to the encryption unit 33. The encryption unit 33 processes the digital signal to generate a password.

In step S20, the storage unit 34 stores the password in the storage device 40 of the pressure key 1, and the transmission unit 35 transmits the password to the computing device 2. The computing device 2 stores the password in the storage device 21 and locks the computing device 2 by the password. The pressure key 1 is then disconnected from the computing device 2. In another embodiment, the computing device 2 may be locked after the pressure key 1 is electronically disconnected from the computing device 2.

In step S30, in a second instance, when the user intends to unlock the computing device 2, the pressure key 1 is connected to the computing device 2 via the port 50 by the user. In response to receiving a second signal of the enter button 62 being pressed by the user, the receiving unit 31 triggers the transmission unit 35 to retrieve the password from the storage device 40 and send the password to the computing device 2.

In step S40, the computing device 2 determines if the password received from the pressure key 1 matches the password stored in the storage device 21. If the received password matches the password stored in the storage device 21, step S50 is implemented, the computing device 2 is unlocked using the received password. Otherwise, if the received password does not match the password stored in the storage device 21, step S60 is implemented, the computing device 2 fails to be unlocked.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A pressure key, comprising:
   a port that connects the pressure key to a computing device;
   a storage device; and
   a microprocessor chip that comprises one or more programs, when executed by the microprocessor chip, causes the microprocessor chip to perform operations of:
   in response to receiving a first signal of a record button being pressed by a user, triggering a pressure sensor of the pressure key to record a pressure signal input by the user;
   converting the pressure signal into a digital signal,
   processing the digital signal using a preset rule to generate a password, and storing the password into the storage device, wherein the preset rule in a first case is an encryption algorithm and in a second case is the taking of at least a portion of digital values of the digital signal as the password;
   sending the password to the computing device, locking the computing device by the password, and electronically disconnecting the pressure key from the computing device; and
   in response to a second instance of electronically connecting the pressure key to the computing device and receiving a second signal of an enter button being pressed by the user, without the user entering the password or receiving any pressure signals, retrieving the password from the storage device and sending the password to the computing device to unlock the computing device.

2. The pressure key as claimed in claim 1, wherein the operations further comprise:
   in response to a second instance of electronically connecting the pressure key to the computing device and receiving a second signal of an enter button being pressed by the user, retrieving the password from the storage device and sending the password to the computing device to unlock the computing device.

3. The pressure key as claimed in claim 2, wherein the record button and the enter button are physical buttons configured on the pressure key.

4. The pressure key as claimed in claim 2, wherein the record button and the enter button are virtual icons displayed on a display device of the computing device and are selectable by the user.

5. A method for protecting security of a computing device, comprising:
   electronically connecting a pressure key to the computing device;
   in response to receiving a first signal of a record button being pressed by a user, triggering a pressure sensor of the pressure key to record a pressure signal input by the user by a microprocessor chip of the pressure key;
   converting the pressure signal into a digital signal,
   processing the digital signal using a preset rule to generate a password, storing the password into a storage device of the pressure key, and sending the password to the computing device by the microprocessor chip, wherein the preset rule in a first case is an encryption algorithm and in a second case is the taking of at least a portion of digital values of the digital signal as the password;
   locking the computing device by the password, and electronically disconnecting the pressure key from the computing device; and
   in response to a second instance of electronically connecting the pressure key to the computing device and receiving a second signal of an enter button being pressed by the user, without the user entering the password or receiving any pressure signals, retrieving the password from the storage device of the pressure key and sending the password to the computing device to unlock the computing device.

6. The method as claimed in claim 5, further comprising:
   in response to a second instance of electronically connecting the pressure key to the computing device and receiving a second signal of an enter button being pressed by the user, retrieving the password from the storage device and sending the password to the computing device by the microprocessor to unlock the computing device.

7. The method as claimed in claim 6, wherein the record button and the enter button are physical buttons configured on the pressure key.

8. The method as claimed in claim 6, wherein the record button and the enter button are virtual icons displayed on a display device of the computing device and are selectable by the user.

9. A microprocessor chip of a pressure key having stored thereon instructions that causes the microprocessor chip to perform operations of:
   in response to electronically connecting the pressure key to a computing device and receiving a first signal of a record button being pressed by a user, triggering a pressure sensor of the pressure key to record a pressure signal input by the user;
   converting the pressure signal into a digital signal,
   processing the digital signal using a preset rule to generate a password, and storing the password into a storage device of the pressure key, wherein the preset rule in a first case is an encryption algorithm and in a second case is the taking of at least a portion of digital values of the digital signal as the password;

sending the password to the computing device, locking the computing device by the password, and electronically disconnecting the pressure key from the computing device; and in response to a second instance of electronically connecting the pressure key to the computing device and receiving a second signal of an enter button being pressed by the user, without the user entering the password or receiving any pressure signals, retrieving the password from the storage device of the pressure key and sending the password to the computing device to unlock the computing device.

10. The microprocessor chip as claimed in claim 9, wherein the operations further comprise:

in response to a second instance of electronically connecting the pressure key to the computing device again and receiving a second signal of an enter button being pressed by the user, retrieving the password from the storage device and sending the password to the computing device to unlock the computing device.

11. The microprocessor chip as claimed in claim 10, wherein the record button and the enter button are physical buttons configured on the pressure key.

12. The microprocessor chip as claimed in claim 10, wherein the record button and the enter button are virtual icons displayed on a display device of the computing device and are selectable by the user.

* * * * *